(12) United States Patent
Fiene (10) Patent No.: US 7,445,353 B2
(45) Date of Patent: *Nov. 4, 2008

(54) DISTRIBUTED LIGHTING SYSTEM

(75) Inventor: Dale E. Fiene, Algonquin, IL (US)

(73) Assignee: Ole K. Nilssen, Bonita Springs, FL (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/801,173

(22) Filed: Mar. 16, 2004

(65) Prior Publication Data

US 2004/0174701 A1  Sep. 9, 2004

Related U.S. Application Data

(63) Continuation-in-part of application No. 09/650,496, filed on Aug. 29, 2000, now Pat. No. 6,814,462.

(51) Int. Cl.
*F21S 4/00* (2006.01)

(52) U.S. Cl. .................. 362/133; 362/147; 362/148; 362/152; 362/227; 362/235; 362/225; 362/221; 362/216; 362/219; 362/260; 362/652; 362/391

(58) Field of Classification Search ............... 362/133, 362/147, 148, 152, 227, 235, 225, 221, 216, 362/219, 260, 391, 652, 640, 249; 439/419, 439/414, 417, 404
See application file for complete search history.

(56) References Cited

U.S. PATENT DOCUMENTS

| | | | | |
|---|---|---|---|---|
| 4,521,839 A * | 6/1985 | Cook et al. | ........... | 362/238 |
| 5,141,449 A * | 8/1992 | Tieszen | ........... | 439/419 |
| 5,559,393 A * | 9/1996 | Nilssen | ........... | 315/58 |
| 5,829,865 A * | 11/1998 | Ahroni | ........... | 362/657 |
| 6,373,725 B1 * | 4/2002 | Chang et al. | ........... | 363/21.01 |

* cited by examiner

*Primary Examiner*—Sharon E Payne (57) ABSTRACT

A low cost under-cabinet and display case lighting system that permits the highest degree of flexibility in the installation and location of luminaires for under-cabinet and display case lighting. The system consists of a high-frequency power source, an interconnection cord, and one or more high-frequency luminaires. The high-frequency power source is powered from a source of 50 or 60 Hertz power. The interconnection cord is connected to the high-frequency output of high-frequency power source. The high-frequency luminaires are mounted in the desired locations under the cabinets or display case shelves. Any number of high-frequency luminaires (within the capacity of the high-frequency power source) may be added.

18 Claims, 6 Drawing Sheets

DISTRIBUTED LIGHTING SYSTEM

REFERENCE TO RELATED APPLICATIONS

This application is a continuation-in-part of application Ser. No. 09/650,496 filed Aug. 29, 2000 now U.S. Pat. No. 6,814,462.

BACKGROUND

1. Field of Invention

This invention relates to gas discharge lamp luminaires in general, and to gas discharge lamp luminaires for under-cabinet type lighting in particular.

2. Description of Prior Art

Current fluorescent luminaires for under-cabinet applications typically consist of a plastic or metal enclosure which contain a fluorescent lamp ballast, wiring to lampholders, lampholders, one or more fluorescent lamps, and a lens. The fluorescent lamp ballast, wiring to lampholders and the back part of the lampholders are contained in one compartment of the enclosure. This part of the enclosure also contains the connection of the wiring from the 60-Hertz power source to the input of the fluorescent lamp ballast. A less common arrangement is to place the 60-Hertz fluorescent lamp ballast in a "remote ballast enclosure" and connect the "remote ballast enclosure" to the balance of the luminaire by way of a BX cable. In both cases, the size of the enclosure is substantial compared to the size of the fluorescent lamps themselves. This is because the fluorescent lamp ballast is powered from a 60-Hertz source, which results in a physically large package. Using an electronic ballast generally contributes to a significant weight reduction, assuming the ballast is not potted with asphalt, but the physical size is usually not dramatically reduced. The connection from the 60 Hertz source to the fluorescent lamp ballast has to be made in an enclosure that meets specific requirements dictated by Underwriters Laboratories' *STANDARD FOR FLUORESCENT LIGHTING FIXTURES* (UL1570); therefore, the enclosure is much larger, heavier and more expensive than necessary with instant invention. Nilssen discloses the use of high-frequency power limited voltage to power fluorescent lamps in a number of his patents. In FIG. 14 of U.S. Pat. No. 5,640,069; Nilssen discloses an under-cabinet lighting system where a number of lamp structures are plugged into one another by connecting the male-type input port of one lamp structure into the female-type output port of the preceding lamp structure. As shown in FIG. 14 of the Nilssen patent, this is accomplished by plugging the male-type-input port directly into the female-type output port. This approach works well for designs that use linear lamps and where a continuous line of light is desired. This approach does not work at all for single-ended lamps. That same figure also shows an alternate approach, which is implemented by making this connection with a short interconnecting cord. Although adding some flexibility when used in combination with the previous approach it requires that a wide selection of lengths of previously manufactured interconnecting cords be stocked and available or that the various lengths of cords need to be made up at the time of installation. If the interconnecting cords are used under a wall cabinet, a relatively large hole needs to be drilled between the lower portion of the adjacent sides of the wall cabinets to accommodate the connectors on the interconnecting cords, which are significantly larger than the cord itself

OBJECTS AND ADVANTAGES

Accordingly, several objects and advantages of my invention are a simpler and more flexible system for installing and connecting under-cabinet type lighting plus a self-contained one-piece ballasted-socket assembly for single-ended lamps that can be mounted directly beneath a cabinet or a shelf. The unit is much lighter and more compact than existing under-cabinet fixtures currently available.

Still further objects and advantages will become apparent from a consideration of the ensuing description and accompanying drawings.

REFERENCE NUMERALS 10 wall cabinet 58 recessed channel B
12 wall cabinet bottom 60 base cover plate
14 high-frequency power supply 62 double Biax lamp
16 duplex wall outlet 64 mounting base
18 high-frequency output cord 66 ballast housing
20 access hole 68 Biax lamp ballasted-socket assembly
22 cabinet side panels 70 long Biax lamp
24 high-frequency ballasted-socket 72 Biax lamp socket assembly 74 support bracket
26 slide-on cover 76 recess
28 2D lamp 78 transformer
30 recessed channel 80 cathode windings
32 reflector 82 ballasting capacitor
34 high-frequency input terminal #1 84 power level jack
36 high-frequency input terminal #2 86 power level plug
38 base 87 gas discharge lamp
40 base tabs 88 output terminals
42 column 89 cathode
44 four-pin lamp socket 90 power increasing capacitor
46 lamp plug assembly 91 cathode terminal
48 cover tabs 92 tank capacitor
50 center ridge 94 tank inductor
52 screw holes 96 starting aid capacitor
54 two lamp high-frequency ballasted-socket 98 supplemental ballasting capacitor
assembly 100 three-terminal socket
56 recessed channel A 102 power level jumper

SUMMARY

This invention is directed to a design of an under-cabinet type lighting system. The system is comprised of a high-frequency power source, an interconnecting power cord, and one or more self-contained one-piece ballasted-socket assemblies for single-ended lamps. The high-frequency power source is connected to a 50 or 60 Hertz power line. An interconnecting power cord is connected to the output of the high-frequency power source and routed beneath the cabinets or shelves. In one embodiment, the ballasted-socket assemblies are then mounted directly beneath the cabinets or shelves. The interconnecting power cord is then placed into a recessed channel built into the ballasted-socket luminaire and a cover is slid over the channel forcing the cord down and into a pair of input terminals that make electrical contact with the conductors within the interconnecting cord. A number of additional ballasted-socket assemblies can be added at any point along the length of the interconnecting power cord up to the maximum power rating of the high-frequency power source.

DESCRIPTION—PREFERRED EMBODIMENT

Figure 1:
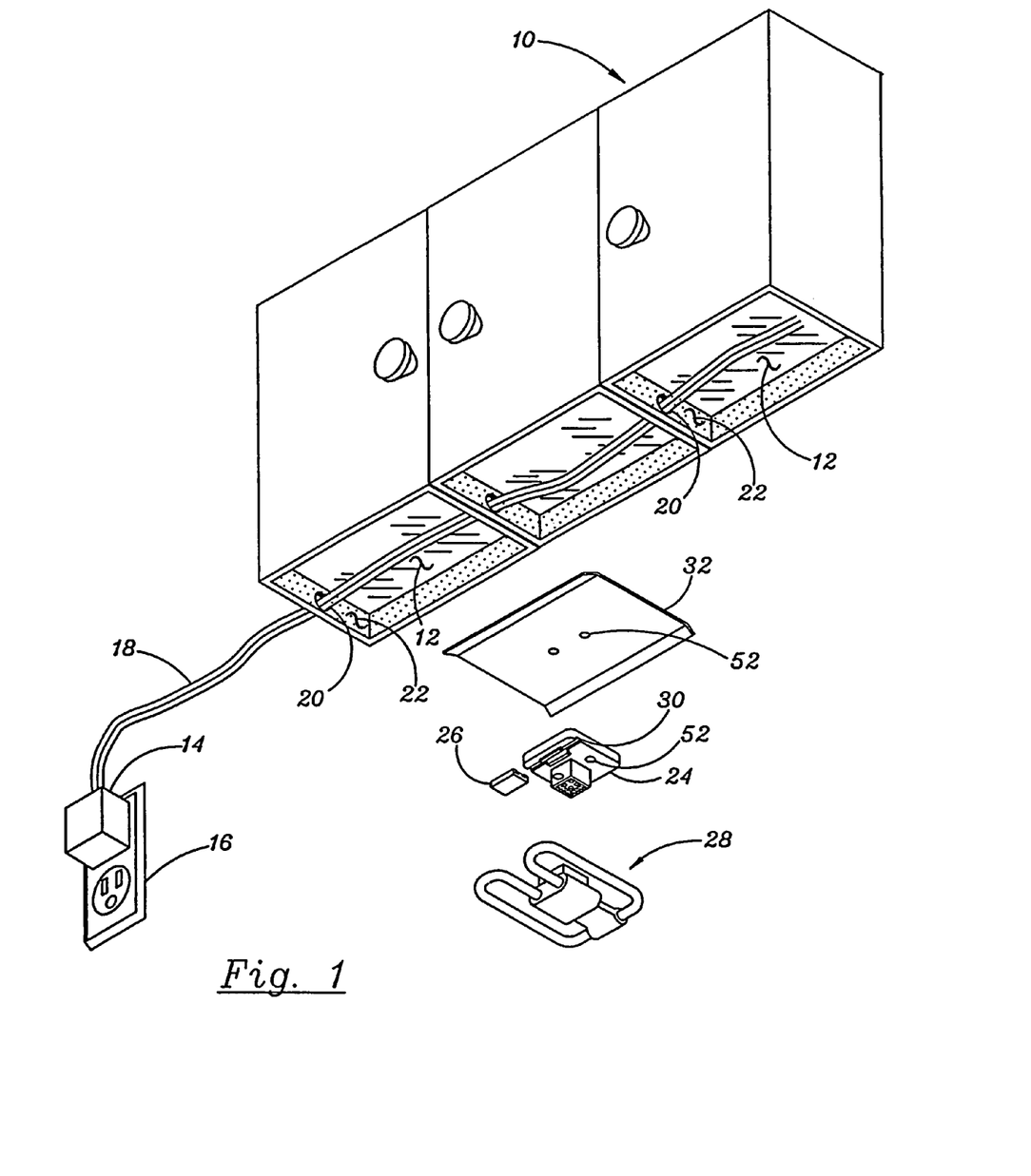
FIG. 1 shows a view of the underside of a kitchen wall cabinet and the basic components of the under-cabinet lighting system.

FIG. 1 shows a view of the underside of a kitchen wall cabinet 10. As shown in the drawing the front, sides, and back of the cabinet actually extend 1.5 to 2 inches below the wall cabinet bottom 12. A high-frequency power supply 14 is shown plugged into a duplex wall outlet 16. A high-frequency output cord 18 extends from the high-frequency power supply 14 through access holes 20 that are drilled through the cabinet side panels 22. Beneath the cabinet is shown high-frequency ballasted-socket assembly 24 with slide-on cover 26 and 2D lamp 28. An optional reflector 32 can be installed between the wall cabinet bottom 12 and the high-frequency ballasted-socket assembly 24.

Figure 2:
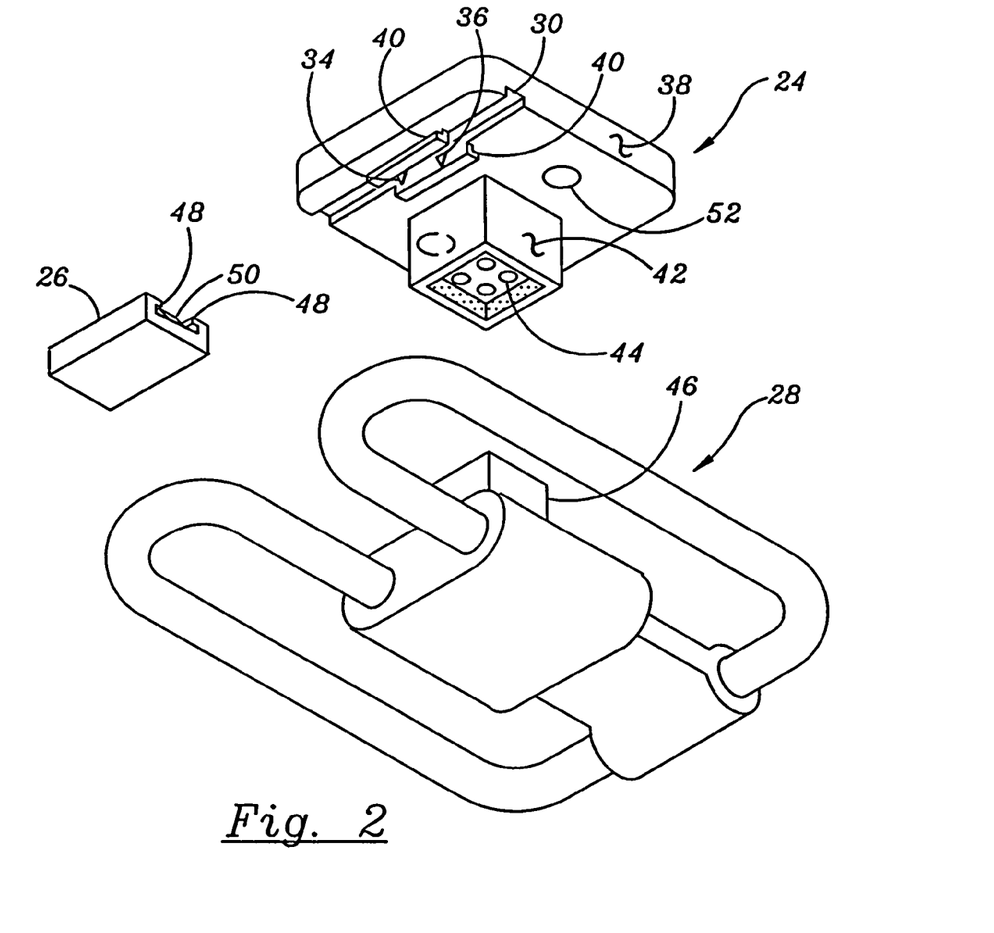
FIG. 2 shows a more detailed view of a high-frequency ballasted-socket assembly shown in FIG. 1.

FIG. 2 shows a more detailed view of the high-frequency ballasted-socket assembly 24 shown in FIG. 1. In the base 38 of the high-frequency ballasted-socket, assembly 24 is a recessed channel 30. The recessed channel 30 contains high-frequency input terminal #1 34 and high-frequency input terminal #2 36. The two high-frequency input terminals are located in opposite lanes within the recessed channel 30 and protrude approximately 1/16 to 1/8 of an inch above the bottom of the channel. Above the top surface of and on alternate side of the recessed channel 30 protrude a pair of base tabs 40. Extending down from the base 38 is a column 42, which along with the base 38 contains ballasting circuitry such as that shown in FIG. 5. The column 42 also includes a four-pin lamp socket 44. Incorporated into the four-pin lamp socket 44 are a pair of recesses (not shown), which are engaged by a pair of support tabs (also not shown) built into the base of the 2D lamp plug assembly 46 of the 2D lamp 28. A pair of screw holes 52 is provided on alternate side of column 42 through base 38. The slide-on cover 26 includes a pair of cover tabs 48 on alternate sides of the slide-on cover, which are designed to engage with the base tabs 40. In the center of the slide-on cover 26 is a center ridge 50. The center ridge 50 extends the length of the slide-on cover approximately 1/8 of an inch above the inside surface. Each end tapers down to being flush with the inside surface starting approximately 1/8 inch in from each end.

Figure 3:
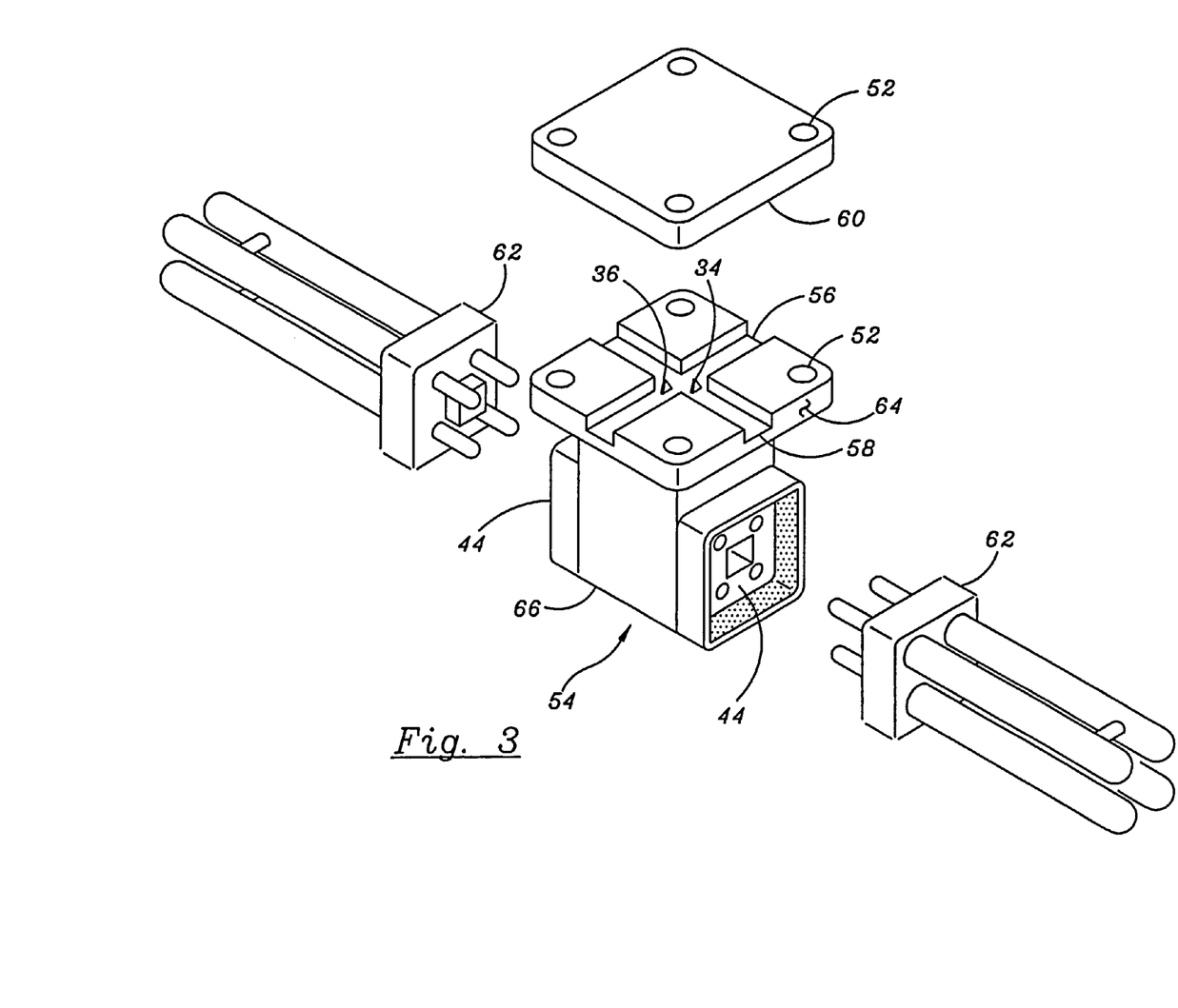
FIG. 3 shows a two-lamp ballasted-socket assembly for under-cabinet lighting using two double Biax lamps.

FIG. 3 shows a two-lamp ballasted-socket assembly 54 for under-cabinet lighting shown with two double Biax lamps 62. The mounting base 64 contains four screw holes 52 and a recessed channel A 56 and a recessed channel B 58 intersecting at right angles. In the area common to recessed channel A 56 and recessed channel B 58 are two conductive input terminals, high-frequency input terminal #1 34 and high-frequency input terminal #2 36. The terminals are offset from one another, such that, if the two intersecting channels are thought of as two lane highways each of the two terminals is in the opposite lane of each of the respective channels. The ballast housing 66 extends down from the mounting base 64 and encloses the high-frequency ballasting circuitry (not visible in this figure, but shown schematically in FIG. 6). Incorporated into the ballast housing are two four-pin lamp sockets 44. The four-pin lamp sockets 44 are capable of receiving and supporting a double Biax lamp 62. The base cover plate 60 contains four screw holes 52. It may be desirable to provide matching recesses in the base cover plate 60 to aid assembly.

Figure 4:
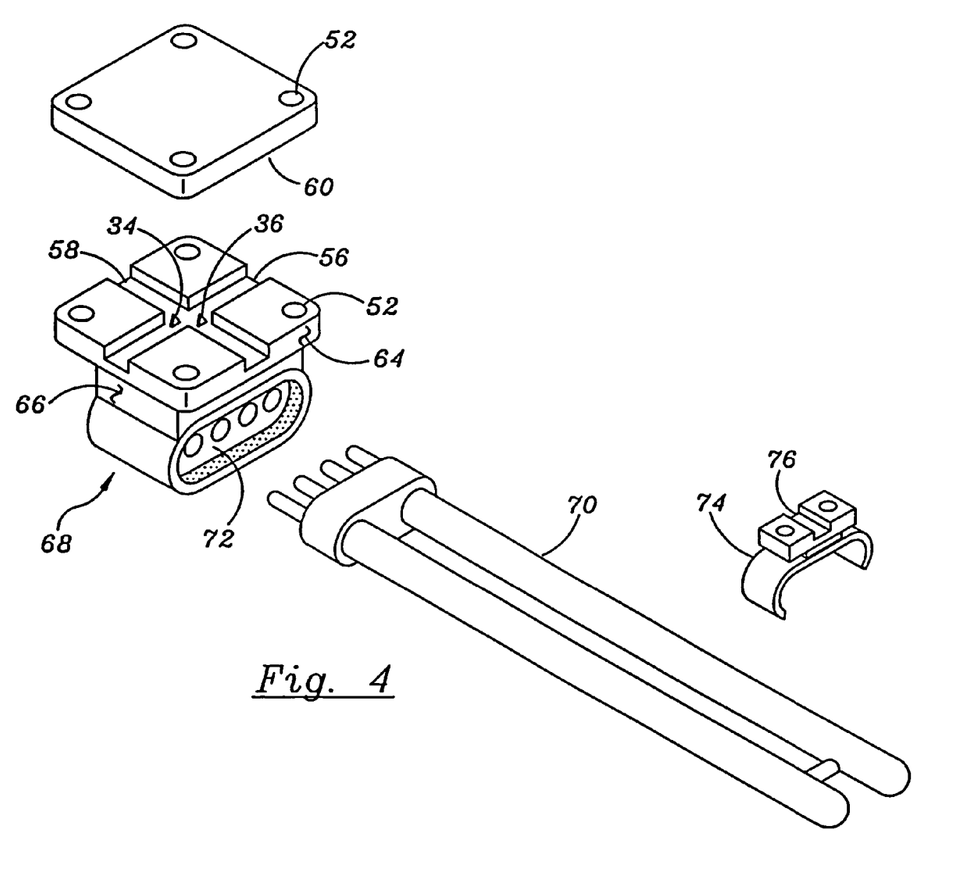
FIG. 4 shows a ballasted-socket assembly applied to a single long Biax lamp.

FIG. 4 shows a Biax lamp ballasted-socket assembly 68 shown with a long Biax lamp 70. As in the previous example the mounting base 64 contains four screw holes 52 and a recessed channel A 56 and a recessed channel B 58 intersecting at right angles. In the area common to recessed channel A 56 and recessed channel B 58 are two conductive input terminals, high-frequency input terminal #1 34 and high-frequency input terminal #2 36. The terminals are offset from one another as described above. The ballast housing 66 extends down from the mounting base 64 and encloses the high-frequency ballasting circuitry (not visible in this figure, but shown schematically in FIG. 5). Incorporated into the ballast housing is a long Biax lamp socket 72. The Biax lamp socket 72 is capable of receiving and supporting one end of a Biax lamp 70. Due to the length and weight of a long Biax lamp, an additional support bracket 74 is required to hold the far end of the lamp in place. The support bracket 74 is provided with recess 76. The base cover plate 60 contains four screw holes 52.

Figure 5:
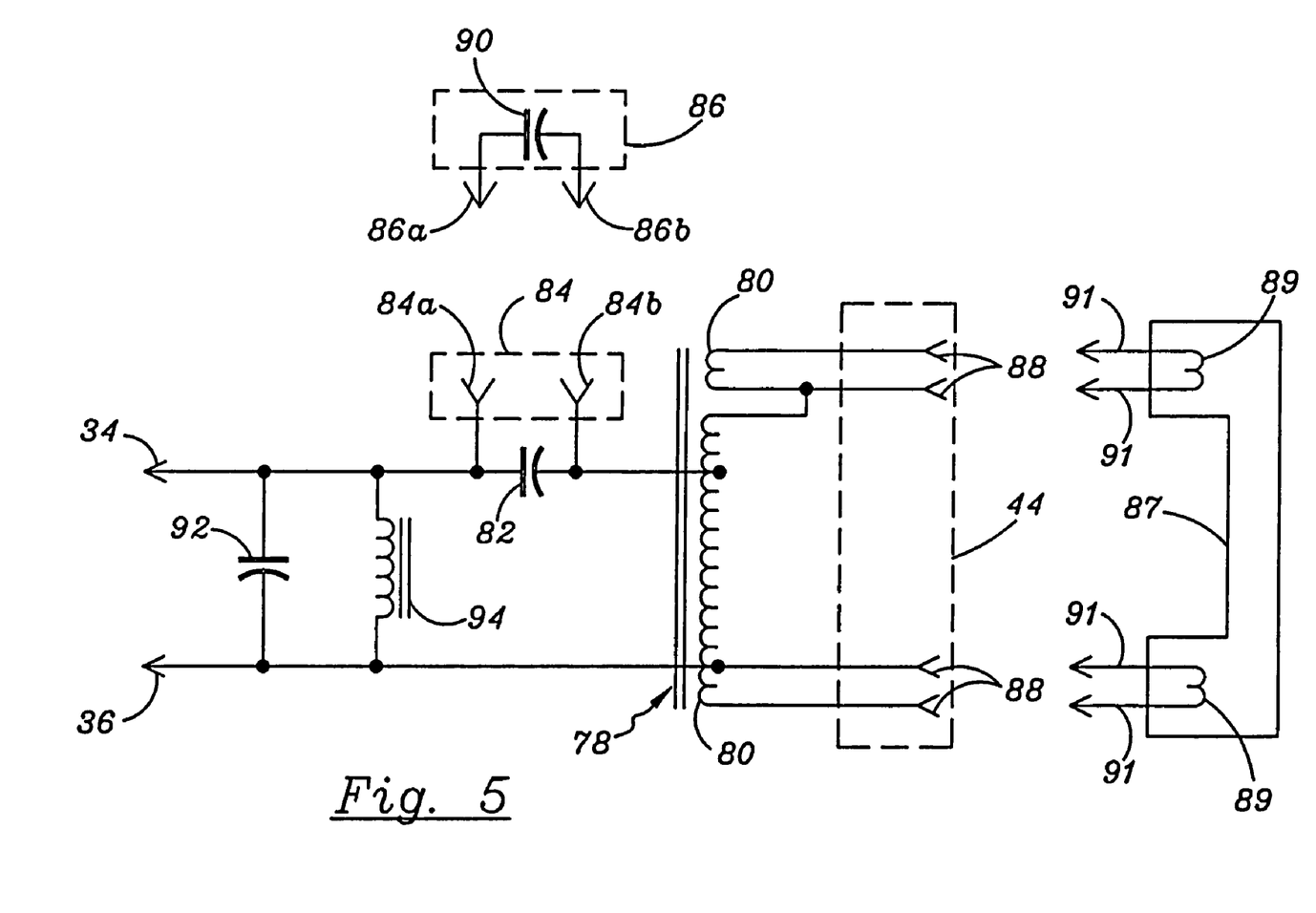
FIG. 5 schematically shows a typical one-lamp ballasted-socket assembly circuit.

FIG. 5 schematically shows a typical single-lamp ballasted-socket circuit for under-cabinet lighting. The high-frequency input terminal #1 34 and high-frequency input terminal #2 36 are provided for connection to high-frequency output cord 18 shown in FIG. 1. The output terminals 88 are part of the four-pin lamp socket 44 of FIG. 2 or long Biax lamp socket 72 of FIG. 4. The output terminals 88 provide voltage to heat lamp cathodes and current-limited voltage to provide lamp current. Transformer 78 is used to step-up or step-down the lamp starting voltage as required by the particular lamp to be used and to supply cathode voltage from the cathode windings 80. Primary ballasting capacitor 82 limits the current supplied to the lamp after lamp ignition. Tank capacitor 92 and tank inductor 94, in concert with the reflected load and primary ballasting capacitor 82, form a parallel resonant tuned circuit. Across primary ballast capacitor 82 may be connected an optional power level jack 84 with terminals 84a and 84b. Power level plug 86 is an insulated module containing power-increasing capacitor 90 and having two parallel-elongated terminals 86a and 86b projecting from it. Gas discharge lamp 87 has two cathodes 89. Each of the cathodes has one or more cathode terminals 91.

Figure 6:
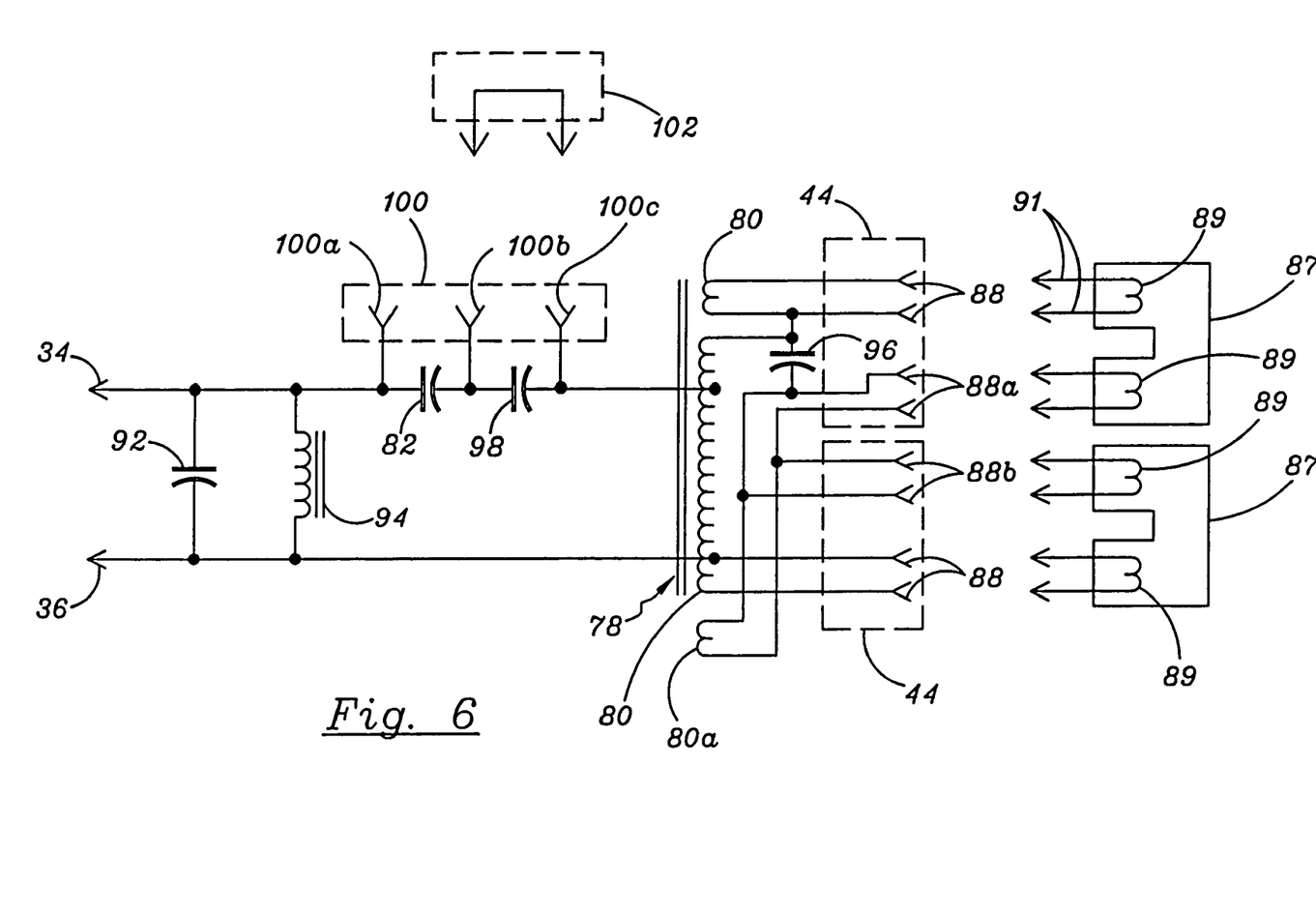
FIG. 6 schematically shows a typical two-lamp ballasted-socket assembly circuit.

FIG. 6 schematically shows a typical circuit for a ballasted-socket for two lamps as is shown in FIG. 3. The high-frequency input terminal #1 34 and high-frequency input terminal #2 36 are provided for connection to high-frequency output cord 18 shown in FIG. 1. The output terminals 88 are part of the two separate four-pin lamp sockets 44. The output terminals 88 provide voltage to heat lamp cathodes and current-limited voltage to provide lamp current. Transformer 78 is used to step-up or step-down the lamp starting voltage as required by the particular lamp to be used. Transformer 78 also supplies cathode voltage from the three cathode windings 80 and 80a. A starting aid capacitor 96 can be provided between the isolated cathode winding and one of the other cathode windings. Primary ballasting capacitor 82 limits the current supplied to the lamps after lamp ignition. Tank capacitor 92 and tank inductor 94, in concert with the reflected load and primary ballasting capacitor 82, form a parallel resonant tuned circuit. An optional supplemental ballasting capacitor 98 can be provided in series with the primary ballasting capacitor 82. If so provided, a three-terminal socket 100 is also provided as shown in the schematic. Terminal 100*b* is connected to the junction of primary ballasting capacitor 82 and supplemental ballasting capacitor 98. Socket terminal 100*a* is connected to the opposite end of primary ballasting capacitor 82 and socket terminal 100*c* is connected to the opposite end of supplemental capacitor 98. The socket terminal 100*a* is spaced the same distance from 100*b* as 100*c* is spaced from 100*b*. Power level jumper 102 is an insulated plug arrangement with two parallel-elongated terminals suitable for insertion into either socket terminals 100*a* and 100*b* or socket terminals 100*b* and 100*c*. The pair of gas discharge lamps 87 each has two cathodes 89. Each of the cathodes has one or more cathode terminals 91.

OPERATION—PREFERRED EMBODIMENT

As shown in FIG. 1 the bottom 12 of kitchen wall cabinets 10 are actually located 1.5 to 2 inches above the bottom edge of the front, rear, and sides of the cabinet. This provides an ideal location to hide lighting to illuminate the kitchen counter top. Unfortunately, the side walls of the cabinets also extend below this bottom. To install lighting under these cabinets it becomes necessary to either cut out sections of the cabinet side panels 22 to create a means to interconnect the lighting fixtures or drill relatively large holes through these side panels to run conduit, BX, or to feed the connector of an interconnecting cord set through. The instant invention permits a much smaller hole to be used to provide wiring access between the individual wall cabinet bottoms for installing the under-cabinet lighting as well as eliminating plugs and or sockets on the luminaires as well as on the interconnecting cords.

Referring to FIG. 1, in the preferred embodiment, a high-frequency power supply 14 is plugged directly into a standard duplex wall outlet 16. The high-frequency output voltage is sinusoidal and may be any voltage up to approximately 150 Volts. Using a voltage of 150 volts has the advantage of minimizing the effect of contact resistance, and it also permits a smaller conductor to be used, but lower voltages could be used if shock hazard is a consideration. Access holes 20 are drilled through the cabinet side panels 22 as close to the wall cabinet bottom 12 as possible. These access holes 20 can be less than a quarter of an inch in diameter. The high-frequency output cord 18 is then fed through the access holes 20 to each wall cabinet bottom 12 requiring lighting. A high-frequency ballasted-socket assembly 24 is then mounted to the wall cabinet bottom 12, such that, the recessed channel 30 is in line with the high-frequency output cord. The high-frequency output cord 18 is placed into the recessed channel 30 of the high-frequency ballasted-socket assembly 24. The slide-on cover 26 slides over the recessed channel 30 forcing the high-frequency output cord 18 down into the recessed channel 30, and onto a pair of high-frequency input terminals 34 and 36 which are shown in more detail in FIG. 2. A gas discharge lamp, such as, a 2D lamp 28 is then inserted into the high-frequency ballasted-socket assembly 24.

To improve the overall efficacy of the lighting system an optional reflector 32 can be provided. The reflector can be as simple as a flat sheet of reflective plastic or metal, or a molded or fabricated piece including bends or ribs to improve rigidity and to attempt to focus and direct the light. In any case the reflector 32 can simply be mounted by placing it on the wall cabinet bottom 12, mounting the high-frequency ballasted-socket assembly beneath it, and then fastening the combination to the bottom of the wall cabinet bottom 12 with screws inserted through the screw holes 52 provided in both the high-frequency ballasted-socket assembly 24 and the reflector 32. Alternately the reflector 32 can be incorporated as part of the high-frequency ballasted-socket assembly 24. As a third alternate design the reflector 32 can include an aperture between the two screw holes 52 large enough to pass over the column 42 and be mounted between the lamp 28 and the high-frequency ballasted-socket assembly 24.

Although the high-frequency power supply 14 is shown as an assembly that is plugged directly into a duplex outlet 16, another design incorporates a line cord emanating from one side of an enclosure and the high frequency output cord emanating from another side. The enclosure is then mounted to the wall cabinet bottom 12. The lights may be turned on and off with a switch incorporated into the high-frequency power supply 14 or via a switch incorporated into the plug of the line cord.

FIG. 3 shows a two-lamp high-frequency ballasted-socket assembly 54. In the basic embodiment shown, the assembly is installed by first locating the base cover plate 60 on the wall cabinet bottom 12 (FIG. 1). The high-frequency output cord is then passed over the base cover plate. A decision is then made, depending on the application, as to whether the lamps should be oriented such that they are parallel to the high-frequency output cord 18 or perpendicular to it. The two-lamp high-frequency ballasted-socket assembly 54 is then placed over the high-frequency output cord 18, routing the cord through recessed channel A 56 or recessed channel B 58. Appropriate size screws are then inserted through the screw holes 52 of both the high-frequency ballasted-socket assembly 54 and base cover plate 60. As the screws are tightened down the high-frequency input terminals #1 and #2 (34 and 36) are forced into high-frequency output cord 18 (FIG. 1) and make electrical connection to the appropriate conductors within the cord. FIG. 3 shows a two-lamp high-frequency ballasted-socket assembly with double Biax lamps. This assembly can be configured to also operate as a single lamp high-frequency ballasted-socket assembly as well as be adapted to handle a variety of gas discharge lamp types.

FIG. 4 shows a Biax-lamp ballasted-socket assembly 68 with a long Biax lamp 70. Shorter varieties of gas discharge lamps, such as, compact fluorescent Biax types can be totally supported by the socket that they are plugged into. Due to the length of the long Biax category of lamps, the lamps cannot be cantilevered out from the socket, but require an additional support element to support the end of the lamp opposite the connector. The support bracket 74 is provided to accomplish this function. The installation of the Biax lamp ballasted-socket assembly is essentially the same as discussed previously regarding the high-frequency ballasted-socket assembly shown in FIG. 3 except the support bracket 74 must also be mounted. Here again the Biax-lamp ballasted-socket assembly 68 can be mounted in one of four possible orientations depending on the application. The lamp can be oriented parallel to the high-frequency output cord or perpendicular to it. If the lamp is oriented parallel to the cord, a recess 76 is provided in the support bracket 74 to allow the high-frequency output cord to pass through and act as a support for the cord.

FIG. 5 is typical of a circuit, which can be used in a ballasted-socket assembly for under-cabinet lighting. In a preferred embodiment, the circuit is designed to be powered from a class II or class III power-limited supply. As a result, the National Electrical Code does not require the interconnecting wires between the power supply and the ballasted-socket assembly to be run in conduit or BX even if the wiring is run within a wall, but permits much lighter weight non-armored cable to be used. In application where the wiring for the under-cabinet lighting is totally exposed (i.e., not run in the wall or behind a cabinet) there is no requirement for the source of power to be restricted to class II or class III source. In order to minimize the physical size of the electronic components used for the ballast circuitry (tank capacitor 92, tank inductor 94, ballasting capacitor 82, and transformer 78), operating at a frequency in the range of 18 kHz to 100 kHz is preferred. The cathode windings 80 provide voltage to heat the lamp cathodes for rapid start operation. Ballasting capacitor 82 is connected in series with transformer 78 to limit the current supplied through the gas discharge lamp 87 connected with the output terminals 88.

By placing the ballasting capacitor in series with the input side of the transformer 78, the voltage across the input to the transformer 78 is reduced after the gas discharge lamp is ignited and begins to draw current through the lamp, in addition to the current being drawn by the cathodes of the gas discharge lamp. This is due to the fact that a portion of the voltage supplied across the two high-frequency input terminals #1 and #2 (34 and 36) is dropped across the ballasting capacitor. As a result of the voltage being reduced to the input of the transformer, the voltage supplied across the cathodes of the gas discharge lamp is also reduced. This causes a reduction in the power dissipated in the cathodes during normal operation, which allows for increased efficiency of operation. By eliminating the cathode windings 80 and increasing the open circuit output voltage delivered across the lamp, instant start operation of the gas discharge lamp can also be achieved.

An optional power level jack 84 can be incorporated by connecting its' two terminals 84a and 84b on alternate ends of ballasting capacitor 82. A power level plug 86 containing power increasing capacitor 90 can be plugged into power level jack 84 on ballasted-socket assemblies where the light level of the gas discharge lamp needs to be increased. Placing the power increasing capacitor 90 in parallel with the ballasting capacitor 82 decreases the impedance in series with the input to the input of transformer 78, which results in an increased lamp current through the gas discharge lamp and an increase in light output. A variety of power level plugs with various values of power increasing capacitors 90 can be made available to provide numerous power levels. Since the power level can only be increased using this approach, the minimum power level is established by ballasting capacitor 82.

Tank capacitor 92 and tank inductor 94, in concert with the reflected load and primary ballasting capacitor 82, form a parallel resonant tuned circuit which is set-up to match the fundamental frequency of the high-frequency power supply. By tuning the ballasted-socket assembly in this manner, the power factor of the ballasted-socket assembly can be made to approach unity.

FIG. 6 is typical of a circuit, which can be used in a two-lamp ballasted-socket assembly for under-cabinet lighting. This circuit operates the same as the circuit in FIG. 5 except that an alternate approach is shown for selecting the power level and the circuit is set up for rapid start operation of two lamps in series. Two four-pin lamp sockets 44 are provided for connecting to two separate gas discharge lamps 87. An additional isolated cathode winding 80a provides cathode voltage to the two cathodes (one from each lamp) which end up being connected in parallel via output terminals 88a and 88b. Since the two lamps are connected in series, the same current flows through both lamps, except for the small current, which flows through the starting aid capacitor 96 connected in parallel with one of the lamps. The starting aid capacitor permits the pair of lamps to start with a voltage substantially less than twice that required to ignite a single lamp.

If power level selection is desired, a supplemental ballasting capacitor 98 is added in series with ballasting capacitor 82. A three-terminal socket 100 is connected across the two capacitors 82 and 98, such that, terminal 100b is connected to the junction of ballasting capacitor 82 and supplemental ballasting capacitor 98. Terminal 100a is connected to the other end of ballasting capacitor 82 and 100c is connected to the other end of supplemental ballasting capacitor 98. If the value ballasting capacitor 82 is chosen to provide the proper nominal light output from the gas discharge lamp and the value of supplemental ballasting capacitor 98 is chosen to be less than the value of ballasting capacitor 82, three levels of light are available. To set the light level at the nominal level the power level jumper is inserted between socket terminals 100b and 100c. A lower light level is selected by inserting the power level plug into terminals 100a and 100b. The lowest light level is selected by leaving the power level jumper out completely.

Alternately, if the value ballasting capacitor 82 is chosen to provide the proper nominal light output from the gas discharge lamp and the value of supplemental ballasting capacitor 98 is chosen to be greater than the value of ballasting capacitor 82, three levels of light are also available. To set the light level at the nominal level the power level jumper is again inserted between socket terminals 100b and 100c. A higher light level is selected by inserting the power level plug into socket terminals 100a and 100b. The lowest light level is selected by leaving the power level jumper out completely.

Since the power level selection is accomplished on the input to the transformer in both FIG. 5 and FIG. 6, the cathode voltage is also affected by changing the power level of the lamps. Since lamp life can be adversely affected by reducing the cathode voltage excessively at the same time the lamp current is reduced for dimming, the range of dimming is somewhat limited unless the cathodes are provided with somewhat higher voltage for nominal operation. This limitation can be eliminated by moving the power level selection circuitry and ballasting capacitor to their traditional location, which is in series with the output of the transformer instead of in series with the input to the transformer. This will eliminate the reduction of cathode voltage as a function of the lamp current level (dimming) and permit a much greater dimming range without adversely affecting the life of the lamps.

Conclusions, Ramifications, and Scope

Accordingly, it can be seen that the invention provides a dramatic reduction in the cost to manufacture, ship and store luminaires. In addition, substantial savings in the cost of installation are achieved since the luminaires can easily be assembled, installed and connected to the power source by non-skilled, non-electrician installers.

Although the description above contains many specificities, these should not be construed as limiting the scope of the invention but as merely providing illustrations of some of the presently preferred embodiments of this invention. Various other embodiments and ramifications are possible within it's scope. For example, although the preferred embodiment describes the Under-cabinet Lighting System with a ballasted-socket designed for a class II or class III high-frequency power input, the Under-cabinet Lighting System concept can also be used with non-class II or III, AC and DC circuits. The ballasted-socket in these situations would merely have to enclose all non-class II and III circuits and wiring, while the input connection would have to meet the local codes that may apply. In the preferred embodiment, the enclosure of the ballasted-socket assemblies are constructed out of non-conductive material, which eliminates the need to carry a ground wire in the interconnecting cord, but they could also be made out of conductive material if the exposed conductive material is grounded.

Although the preferred embodiment teaches the use of insulation displacement connections to an interconnecting power cord, the power source can also be connected to the ballasted-socket assemblies using interconnecting power cords with conventional plugs and sockets or an interconnecting power cord that has stripped leads and is inserted into a "poke-home" type connector.

Thus, the scope of the invention should be determined by the appended claims and their legal equivalents, rather than by the examples given.

Definitions luminaire: a complete lighting unit consisting of a lamp or lamps together with the parts designed to distribute the light, to position and protect the lamps, and to connect and interface the lamps to the power source.

compact fluorescent lamps: single-ended fluorescent lamps such as, Biax, double Biax, triple Biax, quad Biax, long Biax, flat, helical, spring, etc.

high-frequency: frequencies greater than 10 kHz.

insulation displacement connection: an electrical connection technique in which an insulated wire is inserted into an opening of a connector. A metal terminal is forced through the insulation thus displacing the insulation and forming an electrical connection between the terminal and the conductor.

poke-home connector: an electrical connection technique in which a wire that has had a certain length of insulation stripped from it's end is inserted into an opening of a connector. A spring loaded metal tab makes contact with the bare wire forming an electrical connection between the tab and the conductor.

I claim:

1. A method of providing under-cabinet lighting, comprising the steps of:
    passing a high-frequency output cord along the bottom of a cabinet or a shelf,
    placing a ballasted socket assembly over the high-frequency output cord,
    positioning a channel provided in the ballasted socket assembly directly over the high-frequency output cord, and
    mounting the ballasted socket assemblies to the under side of the cabinet or shelf.

2. The process described in claim 1, additionally characterized by including the step of positioning a reflector between the ballasted socket assembly and the bottom of the cabinet or shelf.

3. The process described in claim 1, additionally characterized by including the step of orienting the ballasted socket assembly in one of four possible orientations.

4. The process described in claim 1, additionally characterized by including the step of piercing the insulation of the high-frequency output cord with an insulation displacement connector.

5. A luminaire suitable for connection to and being powered from a high-frequency power source by way of an interconnecting cord;
    the interconnecting cord comprising a first electrical conductor and a second electrical conductor encased within and separated from one another by a common insulating sheath;
    the luminaire including two channels intersecting at right angles;
    either channel being capable of receiving said interconnecting cord;
    the luminaire also including a first input terminal and a second input terminal;
    the input terminals being designed to pierce the insulation of the interconnecting cord; and
    the input terminals being located within the area of the intersection of the two channels and positioned such that the first input terminal making contact with a first electrical conductor and the second input terminal making contact with the second electrical conductor during the installation of the luminaire no matter through which channel the electrical cord is routed.

6. The luminaire described in claim 5, wherein the luminaire can be mounted in place prior to the insertion of the interconnecting cord.

7. The luminaire described in claim 5, wherein the interconnecting cord is installed in place under the cabinet or shelf before the luminaire is mounted in place under the cabinet or shelf.

8. The luminaire described in claim 5, wherein multiple luminaires can be connected to the same interconnecting cord.

9. The luminaire described in claim 5, wherein the luminaire can be connected to the interconnecting cord in any one of four possible orientations.

10. The luminaire described in claim 5, wherein the input terminals have a circular or oval cross-section.

11. A high-frequency under-cabinet lighting system comprising: a high-frequency power source, an interconnecting cable, and multiple luminaires;
    the luminaires including an electrical component having inductive reactance;
    the high-frequency power source being connected to and powered from a standard utility power line and having a high-frequency power output;
    the interconnecting cable being connected to said high-frequency power output;
    said interconnecting cable not being a track of a track lighting system;
    the interconnecting cable being supplied from a manufacturing facility with no luminaires connected thereto; the system further characterized in that the system is installed by an installer;
    during installation, luminaires are connected to a single interconnecting cable at multiple points along the interconnecting cable using an insulation-displacement connection;
    the locations of the luminaires being determined by the installers; and
    the luminaires can be electrically connected to the interconnecting cable in any one of four possible orientations.

12. A high frequency under-cabinet lighting system comprising: a high-frequency power source, an interconnecting cable, and multiple luminaires;
    the luminaires including an electrical component having inductive reactance;
    the interconnecting cable being supplied with no luminaires connected there to;
    the system further characterized in that multiple luminaires can be powered from the same interconnecting cable without severing the interconnecting cable; and
    the luminaires can be electrically connected to the interconnecting cable in any one of four possible orientations.

13. A high-frequency under-cabinet lighting system comprising: a high-frequency power source, an interconnecting cable, and multiple luminaires;

the luminaires including an electrical component having inductive reactance;

the high-frequency power source being connected to and powered from a standard utility power line and having a high-frequency power output;

the interconnecting cable being connected to said high-frequency power output;

said interconnecting cable not being a track of a track lighting system;

the interconnecting cable being supplied from a manufacturing facility with no luminaires connected thereto;

the system further characterized in that multiple luminaires can be powered from the same interconnecting cable without severing the interconnecting cable;

during installation, luminaires are connected to a single interconnecting cable at multiple points along the interconnecting cable using an insulation-displacement connection; and the luminaires can be electrically connected to the interconnecting cable in any one of four possible orientations.

14. A method of providing under-cabinet lighting, comprising the steps of:

mounting the ballasted socket assemblies to the under side of the cabinet or shelf, passing a high-frequency output cord along the bottom of a cabinet or a shelf, placing the high-frequency output cord within a channel provided in the ballasted socket assembly, operating a mechanism that causes the ballasted socket assembly to make electrical contact with conductors within the high-frequency output cord.

15. A method of providing under-cabinet lighting, comprising the steps of:

attaching a reflector to a ballasted-socket assembly, mounting the ballasted socket assembly to the under side of the cabinet or shelf, passing a high-frequency output cord along the bottom of a cabinet or a shelf, placing the high-frequency output cord within a channel provided in the ballasted socket assembly, operating a mechanism that causes the ballasted socket assembly to make electrical contact with conductors within the high-frequency output cord.

16. A method of providing under-cabinet lighting, comprising the steps of:

positioning a reflector between a ballasted-socket assembly and the underside of a cabinet or shelf, mounting the ballasted socket assemblies to the under side of the cabinet or shelf passing a high-frequency output cord along the bottom of a cabinet or a shelf, placing the high-frequency output cord within a channel provided in the ballasted socket assembly, operating a mechanism that causes the ballasted socket assembly to make electrical contact with conductors within the high-frequency output cord.

17. A method of providing under-cabinet lighting, comprising the steps of:

orienting a ballasted-socket assembly in one of four possible orientations, mounting the ballasted socket assembly to the underside of the cabinet or shelf, passing a high-frequency output cord along the bottom of a cabinet or a shelf, placing the high-frequency output cord within a channel provided in the ballasted socket assembly, operating a mechanism that causes the ballasted socket assembly to make electrical contact with conductors within the high-frequency output cord.

18. A method of providing under-cabinet lighting using gas-discharge lamps, comprising the steps of:

mounting the ballasted socket assemblies to the under side of the cabinet or shelf, passing a high-frequency output cord along the bottom of a cabinet or a shelf, placing the high-frequency output cord within a channel provided in the ballasted socket assembly, operating a mechanism that causes the ballasted socket assembly to make electrical contact with conductors within the high-frequency output cord.

\* \* \* \* \*